United States Patent [19]

Nakamura et al.

[11] Patent Number: 4,726,027

[45] Date of Patent: Feb. 16, 1988

[54] DATA RETRANSMITTING METHOD IN COMMUNICATION NETWORK

[75] Inventors: Tsutomu Nakamura, Musashino; Shoji Miyamoto, Kawasaki, both of Japan

[73] Assignee: Hitachi, Ltd., Tokyo, Japan

[21] Appl. No.: 831,873

[22] Filed: Feb. 24, 1986

[30] Foreign Application Priority Data

Feb. 23, 1985 [JP] Japan .................. 60-34857

[51] Int. Cl.⁴ .............................. G08C 25/02
[52] U.S. Cl. ............................. 371/32; 371/41
[58] Field of Search .............. 371/32, 35, 41; 370/79; 375/58, 99; 455/7, 8

[56] References Cited

U.S. PATENT DOCUMENTS

| | | | |
|---|---|---|---|
| 3,359,543 | 12/1967 | Corr | 371/32 X |
| 3,878,333 | 4/1975 | Shimizu | 371/32 X |
| 4,110,558 | 8/1978 | Kageyama | 371/41 X |
| 4,439,859 | 3/1984 | Donnan | 371/32 |
| 4,551,834 | 11/1985 | Lienard | 371/32 X |
| 4,622,682 | 11/1986 | Kumakura | 371/32 X |

OTHER PUBLICATIONS

P. Favre, "Self-Adaptive Transmission Procedure", IBM TDB, vol. 19, No. 4, Sep. 1976, pp. 1283-1284.
D. Tang, "Hybrid Go-Back-N ARQ with Extended Code Block", vol. 24, No. 6, Nov. 1981, pp. 2892-2896.

Primary Examiner—Jerry Smith
Assistant Examiner—Robert W. Beausoliel
Attorney, Agent, or Firm—Antonelli, Terry & Wands

[57] ABSTRACT

In a communication network wherein a computer or terminal equipment is coupled by a data link to each of a plurality of sending and receiving stations which are connected through communication channels, a data retransmitting method in which when an error has developed in a transmission frame, data is retransmitted according to the Go-Back-N Automatic Repeat Request scheme for each of logical links sharing the data link.

5 Claims, 9 Drawing Figures

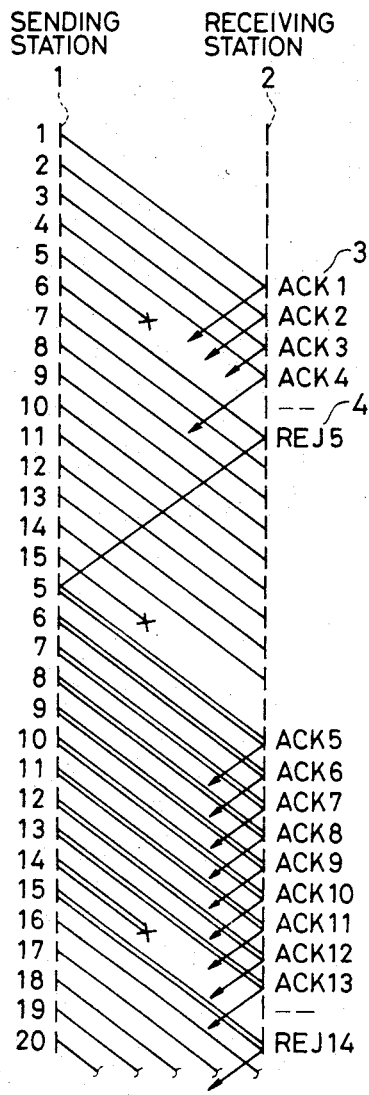
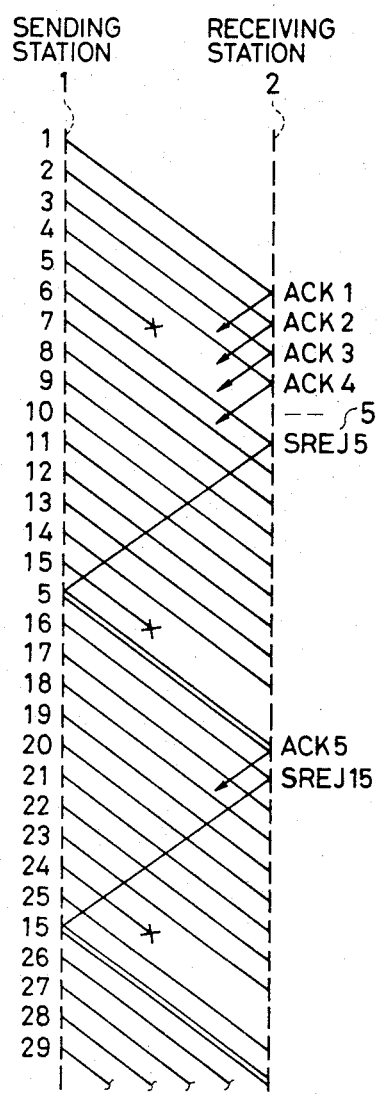

DATA RETRANSMITTING METHOD IN COMMUNICATION NETWORK

BACKGROUND OF THE INVENTION

1. Field of the Invention

The present invention relates to a data retransmitting method, and more particularly to a data retransmitting method which performs error recovery when a transmission error has developed in case of the transmission of data through a communication satellite.

2. Description of the Prior Art

In the case of using a channel, the propagation delay time of which is as great as 250 msec. each way, as in satellite communication, the transmission efficiency lowers drastically when employing a procedure in which the next block of data cannot be sent from the transmitting station until the reception acknowledgement response of the last transferred data block arrives from the receiving station. In satellite communication, therefore, a method capable of continuous transfer has been adopted and the HDLC (High level Data Link Control) protocol stipulated by the ISO (International Organization for Standardization) has been used.

In the HDLC protocol, the REJ (Reject) scheme and the SREJ (Selective Reject) scheme are stipulated as retransmission schemes to be used in the case where a transmission frame (a transmission data block to which a header for control is added) has undergone an error and has not properly reached the opposite side.

The REJ scheme is representative of the so-called "Go-Back-N Automatic Repeat Request scheme." As illustrated in FIG. 1 by way of example, in a case where the receiving side detects the omission of Frame No. 5 because of the reception of Frame No. 6 subsequent to Frame No. 4 and sends back a signal REJ5 indicating a retransmission request for the frame No. 5, the sending side retransmits the erroneous frame (No. 5 frame) and also a series of sent frames (No. 6–No. 15 frames) succeeding thereto (the retransmission is indicated by double lines). However, the satellite channel exhibits a great propagation delay time as stated before, and the number of frames to be transmitted wastefully increases as the speed of transmission becomes higher. More specifically, as illustrated in FIG. 2, when data is passed through the satellite channel, the propagation delay time of 250 msec. $+\alpha$ is taken one way, and the propagation delay time of 500 msec. $+2\alpha$ is taken in a reciprocation, during which about 750 frames can be sent. Accordingly, in a case where a negative or rejection response indicating the development of a transmission error in Frame No. k is sent back to the sending side immediately after the sending side has sent Frame No. $(n+1)$, a delay time of 500 msec. $+2\alpha+(n+1-k)\beta$ is additionally required for the retransmission of Frames No. k thru No. $(n+1)$. Here, $\beta$ denotes the transmission time of one frame. (Reference literature: D. W. Andrews, "Throughput efficiency of logical links over Satellite Channels," International Symposium on Satellite and Computer Communications, Apr. 19, 1983, p. 231-242).

In the case of FIG. 2 where the speed of the satellite channel is 1.544 Mb/sec., when the erroneous frame has arisen, about 750 frames each having a length of 125 bytes are wastefully transferred. On the other hand, this REJ scheme has the advantage that a small number of buffers suffice on both the sending and receiving sides.

Meanwhile, according to the SREJ scheme, only erroneous frames are retransmitted as illustrated in FIG. 3. Therefore, no frame is transferred wastefully. Since, however, two or more signals SREJ cannot be simultaneously sent back according to the provisions of the HDLC protocol, large numbers of buffers are required on both the sending and receiving sides. At present, only the REJ scheme is used, and the SREJ scheme is merely stipulated, but is not generally used.

SUMMARY OF THE INVENTION

An object of the present invention is to ameliorate such problems of the prior art and to provide a data retransmitting method which does not lower the throughput or the channel efficiency even in communications with channels of great propagation delay times, for example, in satellite communication.

For the accomplishment of this object, the data retransmitting method of the present invention provides a communication network wherein a computer or terminal equipment is coupled by a data link to each of a plurality of sending and receiving stations which are connected through communication channels, characterized in that, when an error has developed in a transmission frame, data is retransmitted according to the Go-Back-N Automatic Repeat Request scheme for each of the logical links which share the data link. In accordance with a modification of the present invention, a dedicated frequency for monitoring a channel quality is assigned to each of the sending and receiving stations, and a retransmission procedure is changed to another scheme dynamically depending upon the state of the channel quality found by the monitoring.

The foregoing and other objects, advantages, manner of operation and novel features of the present invention will be understood from the following detailed description when read in connection with the accompanying drawings.

BRIEF DESCRIPTION OF THE DRAWINGS

FIG. 1 is a sequence chart for explaining data retransmission based on the REJ scheme in the prior art;

FIG. 3 is a sequence chart for explaining data retransmission based on the SREJ scheme in the prior art;

DESCRIPTION OF THE PREFERRED EMBODIMENTS

Now, the details of the present invention will be described with reference to the drawings.

Figure 2:
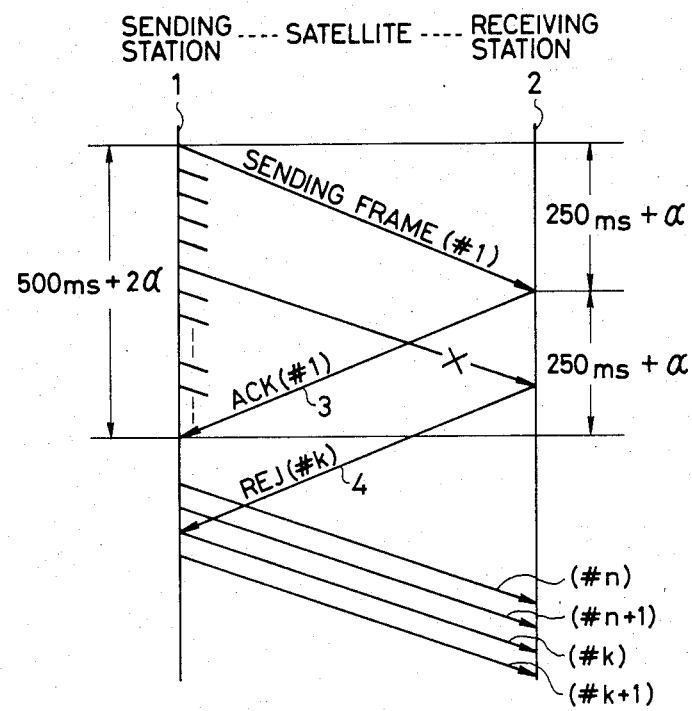
FIG. 2 is an explanatory diagram of the REJ scheme applied to a satellite channel.
Figure 4:
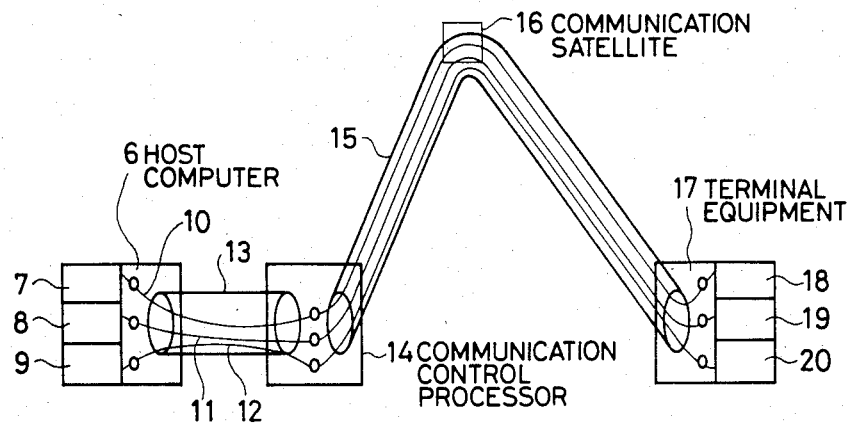
FIG. 4 is a schematic diagram of a satellite communication network showing an embodiment of the present invention.

In FIG. 4 showing the basic arrangement of a satellite communication network to which the present invention is applied, numeral 6 designates a host computer, and numerals 7, 8 and 9 designate application programs in the host computer 6. Numeral 14 indicates a communication control processor, numeral 13 a channel for connecting the host computer 6 and the communication control processor 14, numeral 16 a communication satellite, numeral 17 a terminal equipment, and numeral 15 a data link between the communication control processor 14 and the terminal equipment 17. Numerals 18, 19 and 20 indicate application programs in the terminal equipment 17, and numerals 10, 11 and 12 logical links which are respectively set between the application programs 7 and 18, 8 and 19, and 9 and 20. The data link 15 is shared by the logical links 10, 11 and 12. The generation and extinction of data items are controlled by the application programs in the host computer 6 and the terminal equipment 17. These data items are sent and received between the application programs connected by the logical link 10, 11 or 12, namely, between application programs 7 and 18, 8 and 19, or 9 and 20.

The retransmission method of the present invention conforms to the Go-Back-N ARQ (Automatic Repeat Request) scheme represented by the REJ scheme described before, and it executes processing with note taken of the fact that a data link for retransmission processing is constructed of a plurality of logical links. That is, whereas the retransmission processing of the prior art has been performed in a data link unit, that of the present invention is performed in logical link unit.

In FIG. 4, data flows from the host computer 6 to the terminal equipment 17 and vice versa. Since, however, the flows are the same in point of processing, only the data flow from the host computer 6 to the terminal equipment 17 will be explained. Data items generated in the application programs 7, 8 and 9 are delivered to the communication control processor 14 through the channel 13. In the communication control processor 14, the data items from the logical links 10, 11 and 12 are sent to the terminal equipment 17 through the communication satellite 16 in the FIFO (first-in first-out) order and according to the high level data link control procedure (hereunder, abbreviated to "HDLC"). When the terminal equipment 17 has received the data normally, it sends an affirmative or acknowledgement response (ACK) back to the communication control processor 14 and delivers the received data to the corresponding application program 18, 19 or 20. When the received data involves an error, the terminal equipment 17 sends back a response in the form of a request for retransmission (REJ).

Figure 5:
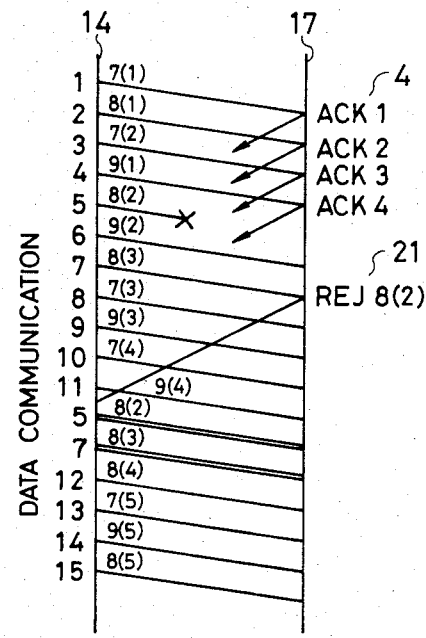
FIG. 5 is a sequence chart showing the procedure for sending and receiving data according to the present invention.
Figure 6:
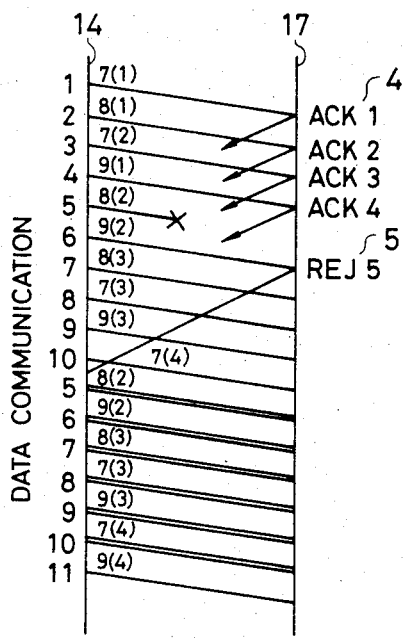
FIG. 6 is a sequence chart of the prior-art REJ scheme shown for the purpose of comparison with the present invention.

FIG. 5 is a sequence chart showing the sending and receiving procedure of the present invention, while FIG. 6 is a sequence chart of the conventional REJ scheme shown for comparison's sake.

Here, symbols 7(1), 8(4), etc. signify the first data generated in the application program 7, the fourth data generated in the application program 8, etc., respectively. Referring first to FIG. 6, the first data of the application program 7 being data serial No. 1 is sent from the communication control processor 14 to the terminal equipment 17. Since this data is properly received by the terminal equipment 17, an acknowledgement response ACK1 is sent back. The first data of the application program 8 being data serial No. 2 is subsequently sent, and an acknowledgement response ACK2 is similarly sent back to the communication control processor 14. Thenceforth, data items to the first data of the application program 9 being data serial No. 4 are properly sent. When the second data of the application program 9 being data serial No. 6 has been received by the terminal equipment 17, it is found that the second data of the application program 8 being data serial No. 5 has not been properly received. Therefore, a retransmission request signal REJ5 is sent back to the communication control processor 14, and the second data of the application program 9 having been received is discarded. Before the signal REJ5 arrives at the communication control processor 14, data items of data serial No. 7 thru No. 10 are sent and are properly received by the terminal equipment 17. However, the terminal equipment 17 discards all of them because the data serial No. 5 has not been properly received. When the signal REJ5 has arrived at the communication control processor 14, all the data items are retransmitted from the data serial No. 5 once more on the basis of the stipulations. In this example, accordingly, the data items of serial No. 6 thru No. 10 are wastefully sent.

In contrast, according to the present invention, as illustrated in FIG. 5, the REJ retransmission is performed for each of the logical links 7, 8 and 9, so that data items to be wastefully sent may be smaller in number (here, only data serial No. 7 is wastefully sent). More specifically, the fact that the second data of the application program 8 being data serial No. 5 has not been properly received by the terminal equipment 17 is confirmed, unlike the example of FIG. 6, at the point of time at which the third data of the application program 8 being data serial No. 7 has been received by the terminal equipment 17. Upon confirming this fact, the terminal equipment 17 discards the third data of the application program 8 having been received and sends back a signal REJ8(2), namely, a request for retransmitting the second data of the application program 8. Before this retransmission request arrives at the communication control processor 14, data items of data serial No. 8 thru No. 11 are sent and are properly received by the terminal equipment 17. In this example, since these data items are not of the application program 8, they are delivered to the corresponding application programs without being discarded, unlike the foregoing case of FIG. 6. When the signal REJ8(2) has arrived at the communication control processor 14, only the second and third data items of the application program 8 are retransmitted. In this example, accordingly, only the third data of the application program 8 is wastefully sent.

In this manner, according to the present invention, the data retransmission processing which the communication control processor 14 executes is independent for each of the logical links 10, 11 and 12 sharing the channel 13 in FIG. 4. In the aforecited example, only data on the logical link 11 corresponding to the application program 8 is retransmitted, and data transmitted by the other logical links is not retransmitted.

While the above description has referred to the case where data is sent from the communication control processor 14 to the terminal equipment 17, the case of the reverse flow of data can be coped with by the same method. In addition, while the embodiment has referred to the case where the host computer 6 and the terminal equipment 17 communicate, the invention is similarly applicable to a case of the communication between host computers. In this case, a data link is set between communication control processors which are connected to the host computers.

In this manner, according to the present embodiment, when an error has developed in transmission of data, retransmission is performed at the level of a logical link to which the data belongs, so that the channel efficiency of the whole satellite communication can be enhanced. This is effective more remarkably as the number of the logical links sharing one satellite channel is increased and as the amount of traffic of the respective logical links are more uniform. Besides, while the present embodiment has exemplified the REJ scheme of the HDLC protocol as the algorithm of the retransmission scheme, the invention is, in general, applicable to all of the Go-Back-N ARQ schemes.

Figure 7:
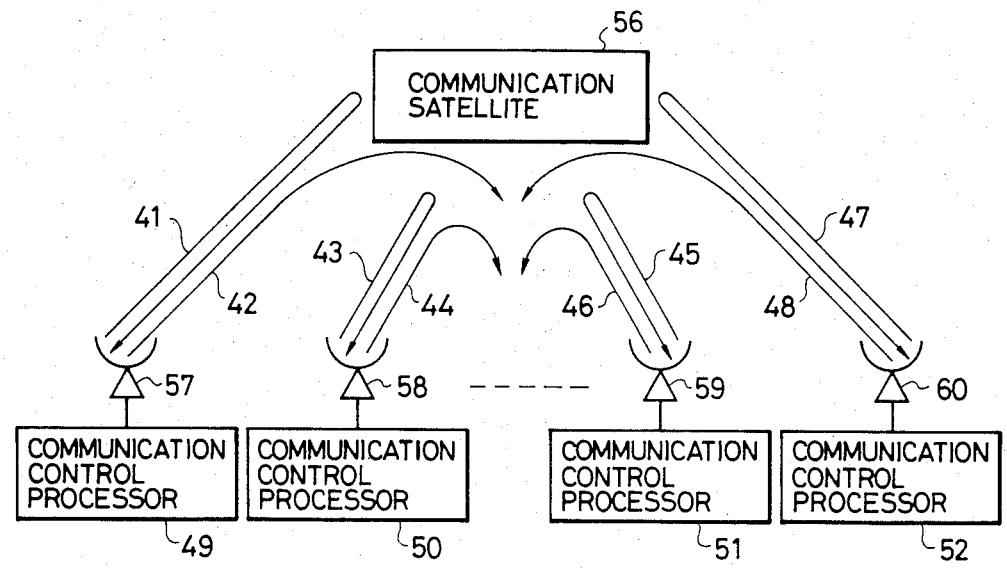
FIG. 7 is a schematic diagram of a satellite communication network showing another embodiment of the present invention.

FIG. 7 is a basic arrangement diagram of a satellite communication channel network showing a second embodiment of the present invention.

In this embodiment, with note taken of the fact that the qualities of satellite channels change depending upon weather conditions and geographical conditions, each earth station monitors the quality of the satellite channel and dynamically switches the retransmission scheme between a plurality of retransmission procedures, for example, between the REJ scheme and the SREJ scheme in accordance with the state of the channel quality, thereby to prevent the lowering of the transmission efficiency of the retransmission mode. In a case where a data link is shared by a plurality of logical links, the REJ scheme is applied as the type wherein a frame is retransmitted for each logical link as in the first embodiment.

In FIG. 7, numeral 56 designates a communication satellite, numerals 57, 58, 59 and 60 earth stations, numerals 41, 43, 45 and 47 dedicated channels for monitoring the qualities of satellite channels, numerals 42, 44, 46 and 48 channels for transmitting data, and numerals 49, 50, 51 and 52 communication control processors for satellite communications (hereinbelow, simply writted "processors").

The earth stations 57, 58, 59 and 60 monitor the channel qualities normally by the use of the respective dedicated channels 41, 43, 45 and 47 for monitoring the satellite channels, and report the conditions of the channels to the corresponding processors 49, 50, 51 and 52 periodically at certain intervals. Each of the processors 49-52 having received the reports compares the channel condition with a channel quality necessary for the current data transmission. If the former is worse than the latter, the processor holds the current sending or receiving state and also transmits a "Change Retransmission Scheme" frame (hereinbelow, abbreviated to 'CRS frame') to the opposite earth station. To the contrary, when the processor has received the CRS frame, it compares sending sequence No. and receiving sequence No. in the CRS frame with the sending sequence No. and receiving sequence No. of its own station, respectively. If the sequence Nos. agree, the processor transmits a "Change Retransmission Ready" frame (hereinbelow, abbreviated to 'CRR frame') to the opposite station. If the sequence Nos. disagree, the processor subjects the receiving sequence No. and sending sequence No. of its own station to the processing of retransmission scheme change in conformity with the sending sequence No. and receiving sequence No. of the received CRS frame respectively and thereafter sends the CRR frame. When the processor has received the CRR frame responsive to the CRS frame, it performs the processing of retransmission scheme change and restarts the sending and receiving processing. In a case where, after the transmission of the CRS frame, the CRS frame has arrived from the opposite station in crossed fashion, the processor transmits the CRS frame once more after a delay time set at random. In a case where the CRS frame has arrived from the opposite station during the delay time, the sending of the CRS frame is cancelled and the aforementioned CRR frame is sent. If the crossing of the CRS frames has arisen again, the same is repeated.

Figure 8:
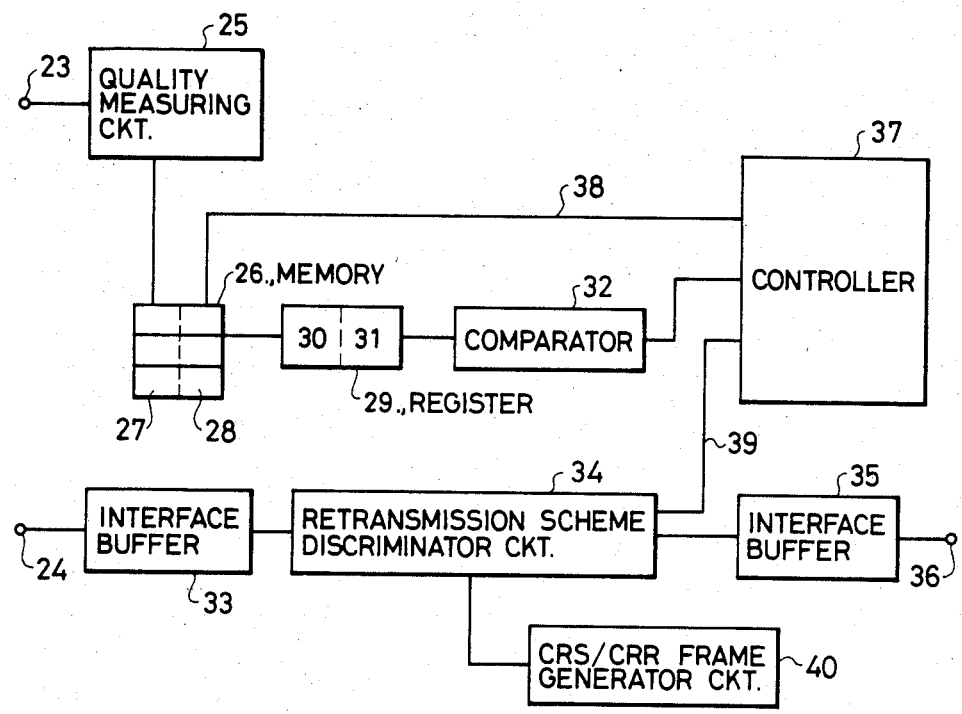
FIG. 8 is a block diagram showing an example of arrangement of a retransmission scheme change processing portion which constitutes a communication control processor in the system of FIG. 7.

FIG. 8 is a block diagram of the retransmission scheme change processing portion of the processor 49 in FIG. 7.

In FIG. 8, numeral 23 designates a signal line for the channel quality, numeral 24 a data line, numeral 25 a channel quality measuring circuit, and numeral 26 a memory which has a field 27 for storing measured channel quality data and a field 28 for storing data on the channel qualities necessary for transmission. Numeral 29 indicates a register which serves to hold data read out from the memory 26, and which consists of fields 30 and 31. Numeral 32 indicates a comparator, numeral 33 an interface buffer with the earth station 57, numeral 34 a retransmission scheme discriminator circuit, numeral 35 an interface buffer with the computer, numeral 36 a data line, and numeral 37 a controller. In addition, numeral 38 denotes a signal line through which the channel quality data necessary for transmission as set in the field 28 of the memory 26 passes, and numeral 39 a signal line through which a retransmission scheme discriminating code and the channel quality data necessary for transmission pass. Shown at numeral 40 is a CRS/CRR frame generator circuit. As the channel quality data, the code error rate or the carrier-to-noise power ratio is employed.

Figure 9:
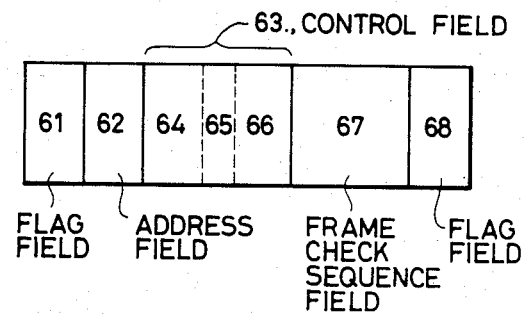
FIG. 9 is a format diagram of a CRS frame and a CRR frame for use in the embodiment of FIG. 7.

FIG. 9 is a format diagram of a CRS frame and a CRR frame which are used in the arrangement of FIG. 8.

In FIG. 9, numeral 61 designates a flag field having a length of 1 byte, numeral 62 an address field having a length of 1 byte, and numeral 63 a control field having a length of 1 byte. Numerals 64, 65 and 66 indicate the fields of the control field 63 respectively, in which the field 64 is a sending sequence No. field, the field 65 is a CRS/CRR frame identifying code field, and the field 66 is a receiving sequence No. field. Numeral 67 denotes a frame check sequence field, and numeral 68 a flag field.

When the system is started, the retransmission scheme is initialized to set the REJ scheme or the SREJ scheme and to set a discrimination code in the retransmission scheme discriminator circuit 34. In the field 28 of the memory 26, channel quality data items determined as a function of sending and receiving data lengths and channel speeds are respectively written at predetermined addresses, and these addresses are recorded in the internal memory of the controller 37. On the basis of information items on the sending and receiving data lengths and the channel speeds, the controller 37 sets through the signal line 38 the addresses of the memory 26 at which the channel quality data items are written. On the other hand, channel quality data items are periodically recorded in the channel quality measuring circuit 25 through the channel quality signal line 23. These data items have mean values calculated at certain time intervals, and on each occasion, the mean value is written in the field 27 of the memory 26 set by the controller 37. When the mean value is written, it is loaded in the register 29 along with the content of the field 28, whereby the channel quality data being the measured result is set in the field 30 of the register, while the channel quality data necessary for transmission is set in the field 31. The contents of the field 30 and the field 31 are compared by the comparator circuit 32. When the measurement data is smaller than the channel quality data necessary for transmission, that is, when (the content of the field 30)<(the content of the field 31) holds, the output of the comparator circuit 32 becomes logic "1." In a case where the last output value of the comparator circuit 32 stored is the logic "1," the controller 37 executes no special processing and merely stores the output value of this time from the comparator circuit 32. Also, in a case where the last output of the comparator circuit 32 is logic "0," the controller 37 instructs the retransmission scheme discriminator circuit 34 to change the retransmission scheme through the signal line 39. On the other hand, when (the content of the field 30)>(the content of the field 31) holds, the output of the comparator circuit 32 becomes the logic "0." In a case where the last output of the comparator circuit 32 stored is the logic "1," the controller 37 instructs the retransmission scheme discriminator circuit 34 to change the retransmission scheme through the signal line 39. Besides, in a case where the last output of the comparator circuit 32 is the logic "0," the controller 37 merely stores the output value of the comparator circuit 32 without executing the processing of retransmission scheme change. When (the content of the field 30)=(the content of the field 31) holds, no output is provided from the comparator circuit 32.

Upon receiving the instruction of changing the retransmission scheme, the retransmission scheme discriminator circuit 34 holds the sending or receiving state and then instructs the CRS/CRR frame generator circuit 40 to generate the CRS frame. The generated CRS frame is delivered to the interface buffer 33, and is sent through the data line 24. Subsequently, the CRR frame responsive to the above CRS frame is received by the interface buffer 33 through the data line 24 and is delivered to the retransmission scheme discriminator circuit 34. The retransmission scheme discriminator circuit 34 instructs an OS (Operating System) to change a retransmission scheme processing module by means of an interrupt. After the change has been completed, the circuit 34 resets the processor into the sending or receiving state of the sending sequence No. 64 and receiving sequence No. 66 of the received CRR frame.

. In a case where the processor has received the CRS frame from the opposite station after sending the CRS frame and before receiving the CRR frame, it generates the CRS frame again by means of the CRS frame/CRR frame generator circuit 40 after the random delay time and then transmits it through the interface buffer 33 as well as the data line 24.

Next, there will be explained a case where the CRS frame has been received from the opposite station.

When supplied with the CRS frame from the data line 24 through the interface buffer 33, the retransmission scheme discriminator circuit 34 checks the sending sequence No. 64 and receiving sequence No. 66 of the CRS frame. If the sequence Nos. are correct, the circuit 34 holds the sending or receiving state, and it instructs the OS to change the retransmission scheme processing module by means of an interrupt and instructs the CRS frame/CRR frame generator circuit 40 to generate the CRR frame. The receiving sequence No. 66 and sending sequence No. 64 of the received CRS frame are respectively set as the sending sequence No. 64 and receiving sequence No. 66 of the generated CRR frame, and are thereafter transmitted through the interface buffer 33 as well as the data line 24. If the sending sequence No. 64 and receiving sequence No. 66 of the received CRS frame are respectively different from the receiving sequence No. and sending sequence No. possessed by the station of the circuit 34, either smaller value of the sending sequence No. 64 of the CRS frame and the receiving sequence No. of the station is set as the receiving sequence No. 66 of the CRR frame generated by the frame generator circuit 40, while either smaller value of the receiving sequence No. of the CRS frame and the sending sequence No. of the station is set as the sending sequence No. 64 of the CRR frame, and the set sequence Nos. are sent through the interface buffer 33 as well as the data line 24.

In this manner, according to the present embodiment, individual earth stations monitor the channel qualities of satellite channels independently of one another, and retransmission schemes are dynamically changed between, for example, the REJ scheme and the SREJ scheme in conformity with the condition of the channel quality, whereby any drawback involved when using the REJ scheme or the SREJ scheme alone can be overcome, and besides, the channel efficiency in the retransmission mode can be enhanced. Moreover, owing to the provision of a CRS frame and a CRR frame, any of the earth stations can request the change of the retransmission scheme. This is especially important in a case where the earth stations are spread in a geographically extensive range, because weather conditions will be considerably different depending upon the earth stations. While, in the embodiment, the retransmission schemes to be used have been described as the two kinds, i.e., the REJ scheme and the SREJ scheme, any retransmission schemes may well be used. In addition, the present invention is applicable even when three or more kinds of retransmission schemes are used.

What is claimed is:

1. A data retransmitting method for use in a communication network wherein a sending station and a receiving station, each of which include a computer or terminal equipment, are coupled by a data link having a significant propagation delay time, and the data link is shared by a plurality of logical links associated with said sending and receiving stations; comprising the steps of:
   transmitting transmission frames according to a unit of said data link from the sending station;
   sending back from the receiving station, upon detecting that any particular one of the transmission frames is an erroneous frame which has not been received properly, a request for retransmission of said particular frame not properly received by said receiving station, and delivering in the receiving station the subsequently received frames of the logical links of the sending side other than the logical link of said erroneous frame to the corresponding logical links on the receiving side; and
   transmitting according to a first retransmission mode, upon receiving the transmission request from the receiving station, only the frames belonging to the same logical link as that of said particular frame among the frames already transmitted following said particular frame and prior to receipt in the sending station of said request for retransmission, from the sending station.

2. A data retransmitting method according to claim 1, wherein said sending and receiving stations each have a second retransmission mode of transmitting and receiving only the erroneous transmission frame again, in addition to said first retransmission mode of transmitting and receiving the erroneous frame and the subsequent series of already transmitted frames again, and further including the steps of selecting either of the first and second retransmission modes in accordance with a current condition of the communication channel and then performing the operation of retransmitting the erroneous frame in accordance with the selected retransmission mode.

3. A data retransmitting method according to claim 2, wherein said sending and receiving stations each perform the steps of:

deciding whether or not change of the retransmission modes is necessary, according to the current condition of the channel;

transmitting, when it is determined that the retransmission mode change is necessary, a frame to that effect to the other station;

transmitting, when the frame requesting the retransmission mode change has been received, a frame responsive thereto; and changing the current retransmission mode to the other retransmission mode after the retransmission mode change requesting frame or the responsive frame has been received.

4. A data retransmitting method for use in a communication network wherein a plurality of sending and receiving stations are connected through satellite communication channels by a data link and wherein a computer or terminal equipment is coupled to each of the sending and receiving stations, each of said sending and receiving stations performing the steps of:

starting data transmission and reception after selecting either of a first retransmission mode of transmitting and receiving an erroneous transmission frame and a subsequent series of already transmitted frames again and a second retransmission mode of transmitting and receiving only the erroneous transmission frame again;

monitoring the channel quality and transmitting a first frame, which request change of the retransmission modes, to the opposite station in accordance with a result of a comparison of the monitored quality with a predetermined reference quality;

transmitting a second frame, which acknowledges the mode change, in response to the retransmission mode change requesting frame from the opposite station; and changing the current retransmission mode to the other retransmission mode and then executing data transmission and reception after receiving the first or second frame.

5. A data retransmitting method according to claim 4, wherein each of said sending and receiving stations uses said data link in common for a plurality of logical links, and the station on a sending side transmits the transmission frames according to a unit of said data link and retransmits only the frames belonging to the same logical link as that of the frame for which the retransmission has been requested, among the frames transmitted following the requested frame during the data transmission in the first retransmission mode.

* * * * *